CURRENT GENERATOR TIMER CONTROL CIRCUIT FOR COMPENSATING FOR BOTH EXTERNAL FIXED TIME DELAY SIGNAL AND EXTERNAL TIME VARIABLE DELAY SIGNAL

Original Filed Dec. 17, 1966

Inventor:
Frank S. Kasper

Oct. 6, 1970 F. S. KASPER 3,532,907

CURRENT GENERATOR TIMER CONTROL CIRCUIT FOR COMPENSATING FOR BOTH EXTERNAL FIXED TIME DELAY SIGNAL AND EXTERNAL TIME VARIABLE DELAY SIGNAL

Original Filed Dec. 17, 1966 4 Sheets-Sheet 2

Inventor:
Frank S. Kasper

Inventor:
Frank S. Kasper

Oct. 6, 1970 F. S. KASPER 3,532,907

CURRENT GENERATOR TIMER CONTROL CIRCUIT FOR COMPENSATING FOR BOTH EXTERNAL FIXED TIME DELAY SIGNAL AND EXTERNAL TIME VARIABLE DELAY SIGNAL

Original Filed Dec. 17, 1966 4 Sheets-Sheet 4

Inventor:
Frank S. Kasper 3,532,907
CURRENT GENERATOR TIMER CONTROL CIRCUIT FOR COMPENSATING FOR BOTH EXTERNAL FIXED TIME DELAY SIGNAL AND EXTERNAL TIME VARIABLE DELAY SIGNAL Frank S. Kasper, Hazel Crest, Ill., assignor to Amtron, Inc., Midlothian, Ill., a corporation of Illinois Original application Dec. 19, 1966, Ser. No. 603,012. Divided and this application Dec. 4, 1969, Ser. No. 882,228
Int. Cl. H03k *17/26*
U.S. Cl. 307—293 9 Claims

ABSTRACT OF THE DISCLOSURE

There is disclosed a timer control circuit for generating a timing cycle to compensate for both an external fixed time delay signal and an external time variable delay signal comprising: a primary current generator responsive to the time variable delay signal for developing a current output proportional in magnitude to the time variable delay signal, the primary current generator being actuated by the time variable delay signal at the commencement of a timing cycle; secondary current generator responsive to the fixed time delay signal and the time variable delay signal for developing a current output proportional in magnitude to the fixed time delay signal and the time variable delay signal; a timing circuit responsive to initiation of the timing cycle for operating the secondary current generator during the timing cycle for a predetermined time interval shorter in duration than the minimum anticipated duration of the timing cycle of the primary current generation means; and a delay circuit coupled to receive the current outputs of both the primary and secondary current generators for terminating the timing cycle when the accumulated current outputs exceed a predetermined value.

CROSS-REFERENCE TO RELATED APPLICATION

This application is a division of application Ser. No. 603,012, filed Dec. 19, 1966, for "Control Systems for Effecting the Timed Actuation of a Controlled Device and Methods Therefor."

BACKGROUND OF THE INVENTION

This invention relates to control systems and more particularly to systems for selectively and accurately controlling the actuation of one or more responsive instrumentalities in specific timed relationship to other operational conditions of the unit or apparatus wherein the invention is employed.

Various industries have sought and are presently seeking reliable and efficient means for effecting the accurate control of responsive instrumentalities used in package fabrication, the deposition of coating materials, receptacle filling, the injection of materials for conditioning products and the like. This demand is clearly exemplified in the packaging and coating fields wherein it is necessary to accurately control the "turn-on" and "turn-off" characteristics of glue depositing devices and coating devices, respectively.

In this connection, it is essential in certain applications (e.g. when controlling the discharge of glue along the sealing seam of a carton being advanced relative to a glue discharge gun by a relatively high speed conveyor, when automatically depositing paint on advancing articles or when filling a stationary or moving receptacle with a material that is subject to a variable flow rate) to correlate the variable system characteristics with the time lag involved in actually initiating and terminating the operation of the responsive device. In effecting such correlation, the system must take into account the time delay characteristics of the unit as well as variations in such delay characteristics that result from system operation. Such correlation is particularly important in automatic spray coating systems, for example, to insure that the operation of the spray coating device is properly initiated as the article to be coated (or a segment thereof) is brought into alignment with the device and that the operation is terminated as the article completes its pass relative to the coating device. It will be appreciated that substantial amounts of coating material are wasted if the selective actuation of the spray coating device is not accurately controlled. Such waste problems and added expense are similarly incurred in the packaging and article filling fields. That is, if the responsive devices employed in package sealing and article filling operations are not similarly controlled with substantial accuracy, both the loss of material and product output results.

The problems discussed above are faced by other industries and are encountered in many instances wherein it is important to accurately control the actuation of a responsive device at a precise period of time and to promptly terminate its operation after the function to be performed by the device has been concluded.

It is an object of the present invention to provide improved systems for controlling the operation of responsive devices in production apparatus and the like.

Still another object of the present invention is to provide control systems capable of accurately and reliably dictating the actuation and deactuation of responsive devices in accordance with pre-established operational patterns.

An additional object of the present invention resides in the provision of systems for controlling various responsive devices in production apparatus or the like so as to reliably compensate for any delayed response characteristics of such devices irrespective of other variations in the operation of the apparatus.

A further object of the present invention resides in the provision of control systems for dictating the operation of responsive devices employed in production apparatus or the like, which control systems have the necessary versatility to be adapted for a variety of applications at relatively low cost and without substantial modification in the basic functional characteristics thereof.

Other objects and advantages of the present invention will become apparent from the following description of one preferred embodiment thereof particularly when considered in conjunction with the accompanying drawings.

DESCRIPTION OF THE PREFERRED EMBODIMENT

Figures 1, 2, 6, 7:
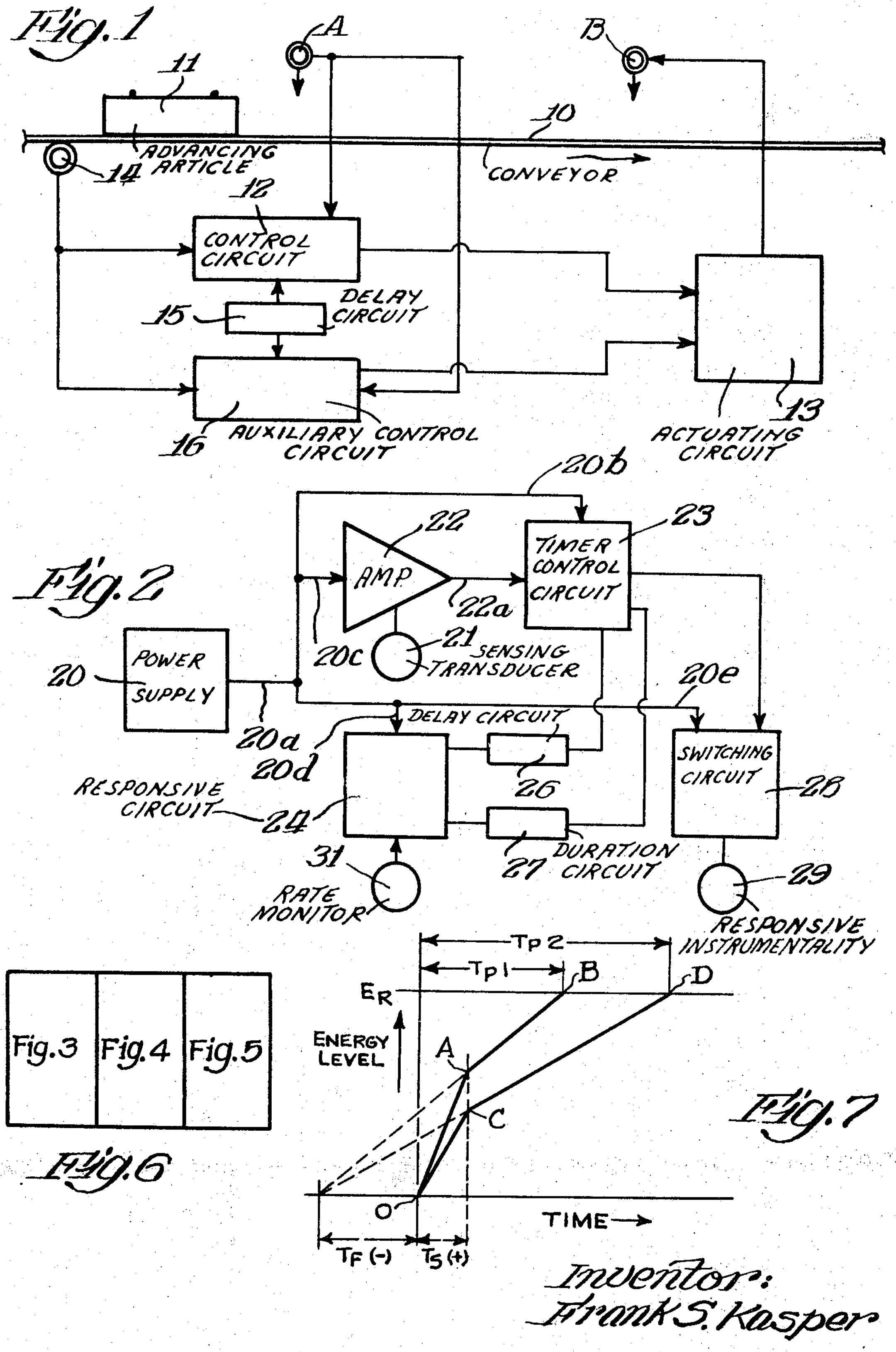
FIG. 1 is a diagrammatic representation of a control system embodying the features of the present invention.
FIG. 2 is a block diagram of the major components of the system as depicted in FIG. 1.
FIG. 7 is a graphical representation of the compensated control function of the system of the present invention.

Referring generally to the drawings, the present invention is directed to systems for controlling the selective actuation of a responsive device or devices during discrete phases of the operating cycle of the apparatus employing same. Without in any sense limiting the versatility of the invention, its general character and operation can perhaps best be appreciated if consideration is given to the use of the system with a particular type of production apparatus. More specifically and considering the application of the invention to a packaging facility, FIG. 1 of the accompanying drawings diagrammatically depicts the system when controlling the automatic application of glue or a similar adhesive substance to a carton being processed along a conveyor line.

In this connection, the numeral 10 represents a suitable transfer device or conveyor whereon an article 11 is disposed so as to be advanced in the direction of the arrow (i.e. from left to right). As the article 11 is advanced relative to the location A, the presence of the article is sensed and, in response to this sensing function, a signal is transmitted by the transducer and supplied to a control circuit 12. The output of the control circuit 12 contributes to the control of an actuating means 13 which in turn dictates the operation of a responsive device positioned at location B. The responsive device at location B performs the desired function of applying glue or adhesive material to a selected portion of the advancing article 11.

In addition to the signal supplied from the sensing transducer at location A, the control circuit 12 is also provided with an output signal from a suitable speed monitoring means 14. The output signal from the speed monitoring means 14 is indicative of the advancing rate of the conveyor 10 and, therefore, of the article 11. Similarly, a signal is supplied to the control circuit from an independent signal source 15, which signal is indicative of the fixed delay characteristics of the system components. That is, the signal from the source 15 reflects the "turn-on"/"turn-off" time delay characteristics of the glue gun and other delay characteristics inherent in the operation of the system components.

An auxiliary control circuit 16 operates essentially in parallel relationship with the control circuit 12. As shown, the control circuit 16 is also provided with a signal from the article sensing transducer at location A, with an advancing rate signal from the conveyor speed monitoring mechanism 14, and with a delay characteristic signal from the source 15. The output of this auxiliary control circuit 16 is supplied to the actuating means 13 along with the output from the control circuit 12. The cooperative action of the control circuits 12 and 16, in response to the input signals supplied thereto, results in the actuating means 13 being rendered effective so as to initiate the function performed on the article 11. In accordance with the invention, this is accomplished at the precise time that a designated segment of this advancing article is in alignment with the output of the glue gun or applicaor provided at location B. These coacting control circuits also dictate when this function (i.e. the application of glue to a designate segment of the article 11) is terminated after the article has advanced sufficiently along its path of travel relative to location B. In the event that the conveyor 10 is subjected to speed variations, the cooperative action of the control circuits 12 and 16 results in an adjustment being made in the output signal supplied to the actuating means 13. Thus, suitable compensation is made for the fixed time characteristics of the system in direct correlation to any transient variations in the advancing rate of the article 11.

An appreciation of the detailed functioning of the system of the present invention will be enhanced if the responsive device is considered from the analogous point of view that its operation is dictated in direct response to the rate at which energy is supplied to the actuating means 13 (i.e. as a result of the combined outputs of the control circuits 12 and 16). Thus, under constant article transfer rate conditions, the combined output energy rate of the control circuits 12 and 16 is directly related to the fixed delay characteristics of the system. However, when the advancing rate of the article is subject to transient variations, these control circuits operate in mode which reflects such speed changes and correlates such speed changes to the time delay characteristics so that product output of the controlled apparatus is not adversely affected. Accordingly, if an increased advancing rate is senser (i.e. dictating that the glue applicator should be actuated earlier in the operating cycle) the combined energy output rate of the control circuits 12 and 16 is increased. On the other hand, if system conditions dictate that the actuation of the responsive device should be delayed (i.e. reflecting a decreased article advancing rate), the combined energy output rate of the control circuits 12 and 16 is reduced.

In a functional sense, this coacting operation of the control circuits 12 and 16 suggests that the compensating adjustments for the delay characteristics (i.e. which occur when speed variations are sensed) result from operation in a "negative time" mode. That is, when the conveyor speed is varied, the control system reacts as though the "fixed delay" period of response was anticipated and began timing out even before the article was sensed at location A (i.e. before the start of the operating cycle). Thus, and notwithstanding a variation in the article advancing rate and assuming the same fixed delay characteristics of the system, the responsive device is rendered effective at the proper instant and remains operative for a period of time necessary to yield a glue bead substantially identical to a glue bead that would be laid down on an article advanced relative to the same glue gun without being subject to advancing rate variations. In the illustrated embodiment, these unique functional characteristics of the system, whereby the fixed delay is anticipated as depicted in FIG. 7, are achieved electronically as will become apparent from the circuits of FIG. 2 and FIGS. 3–5.

Referring first to FIG. 2, a preferred embodiment of the system of the present invention is shown as including a power supply 20 that supplies the necessary operating energy to the other components of the system through suitable circuit means 20*a*, 20*b*, 20*c*, 20*d*, and 20*e*. An article sensing transducer 21 (i.e. a light source and associated photocell) is connected in circuit with an amplifier 22, the output of which is supplied to a timer control circuit 23. The timer control circuit 23 is electrically connected in circuit with a "speed" and "fixed time" responsive circuit 24 by means of individual delay-function and duration-function circuits 26 and 27, respectively. In addition, the output of the timer control circuit 23 is connected to a solid state switching circuit 28 which in turn dictates the operative state of a responsive device 29 (e.g. a glue applicator, spray coating device, article filling dispenser, etc.). As shown, the "speed" and "fixed time" responsive circuit 24 is also supplied with the output of a rate monitoring device (e.g. a tachometer generator) 31.

Considering the aforedescribed system in somewhat greater detail in relation to FIG. 2, the transducer 21 senses the presence of an advancing article 11 at location A as represented in FIG. 1. The output of the transducer is fed to the amplifier circuit 22 and is supplied by suitable circuit means 22*a* to the input of the timer control circuit 23. This sensing of the advancing article by the transducer 21 initiates the automatic functioning of the control system so that (1) the responsive device is not triggered into operation until the desired portion of the article to be treated thereby is suitably aligned with the responsnive device, and (2) the responsive device is operated for the precise interval necessary to complete the desired function. However, it should be understood that for any given application certain preselected conditions will be established in the control circuit so that the requirements of the particular application are accurately reflected in the automatic operation of the system.

In accordance with the present invention (and as shown more specifically in FIGS. 4 and 5), the timer control circuit 23 is preferably comprised of two interrelated and coacting timer modules which are also operatively associated with the delay-function and duration-function circuits 26 and 27 as well as with the circuit 24. Preferably, the interrelated and coacting timer modules of the timer control circuit 23 correspond to those disclosed and claimed in the co-pending application of the common assignee Ser. No. 400,322, now Pat. No. 3,350,688, which was filed on Sept. 30, 1964. As fully described in this co-pending application, each of the timer modules of the timer control circuit 23 is preferably a solid state timing circuit that employs transistorized bistable multivibrator and unijunction firing circuits which cooperatively functon to produce an output signal of preselected duration.

One of the timer modules of the timer control circuit 23 in conjunction with the delay-function circuit 26 and a portion of the responsive circuit 24 is employed to actuate the responsive device 29 when a designated segment of the advancing article is properly positioned with respect to the output of the device. The second of the timer modules, which is actuated in response to the deactuation of the first timer module, similarly coacts with the duration-function circuit 27 and still another portion of the responsive circuit 24 to precisely control the period during which the responsive device 29 is rendered effective.

In operation of the timer control circuit 23, the "sensed article" signal output from the amplifier **22*a* effects a modification in the conductive state of the multivibrator circuit associated with the delay-period timer module. This response of the timer module and the corresponding output from the timer control circuit 23 triggers the start of the "delay" timing cycle as a result of variations in the conductive state of the components forming the delay function circuit 26 and portions of the responsive circuit 24. As previously outlined, this "delay" timing cycle corresponds to the period of time required to allow a selected portion of the article 11 to be advanced into proper position with respect to the responsive device 29** after being sensed at the location A (FIG. 1).

Figure 5:
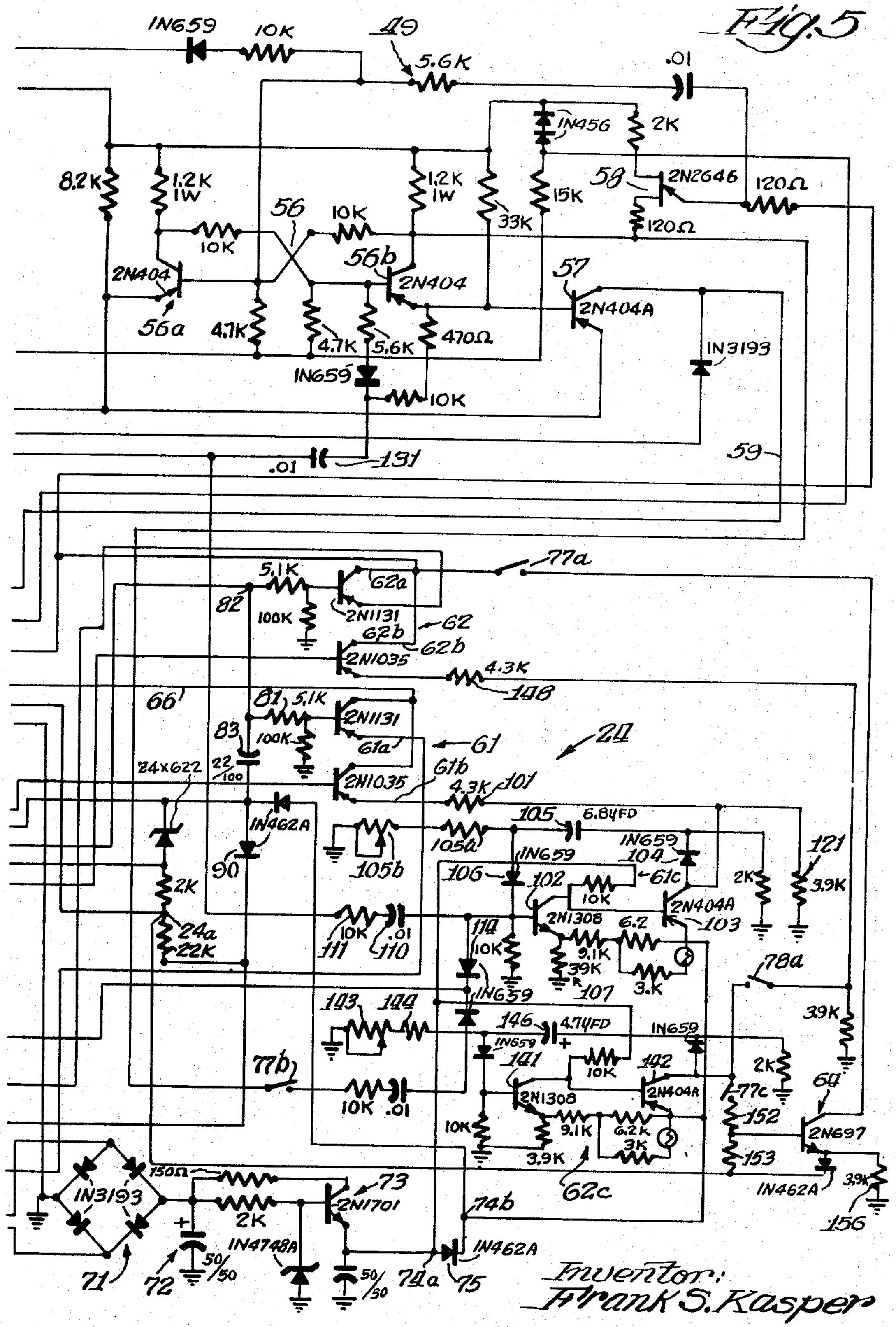

The responsive circuit 24 preferably employs dual current generating circuits, as shown more specifically in FIG. 5. The outputs of these dual current generating circuits have independent and direct effect upon (1) the period during which the operation of the responsive device is delayed and (2) the period for which the responsive device is rendered effective. As previously outlined, this control is effected so that the delay characteristics of the system components do not adversely affect the performance of the system, irrespective of variations in the advancing rate of the article as it is advanced toward and relative to the responsive device 29. Thus, the dual current generating circuits which comprise the responsive circuit 24 translate the usable advancing rate information derived from the rate monitoring device 31 into compensating control signals that are directly reflected in the operation of the timer control circuit and, ultimately, in the actuation of the solid state switching network 28 that controls the responsive device 29.

Considering the dual circuit characteristics of the responsive circuit 24 in somewhat greater detail, the delay period current generating circuitry thereof is initiated into operation along with the delay-function circuit 26 in response to the initiation of the delay period timing cycle of the timer control circuit 23. More specifically, the delay period current generating circuitry of the responsive circuit 24 is basically comprised of two subcircuits. The conductive state of these two subcircuits is directly correlated to the advancing rate of the article as reflected by the output of the rate monitoring device 31. However, one of these subcircuits is additionally conditioned to function in relation to the predetermined fixed time response characteristics of the system components. As is hereinafter more specifically described, these subcircuits coact so as to yield the necessary energy output rate that will directly influence the termination of the delay period function of the timer module circuit 23 through cooperative action with the delay function circuit 26.

In this latter connection, the current output of the delay period portion of the responsive circuit 24 consists of (1) a current component related both to the output of the fixed delay time subcircuit and any sensed variable speed characteristics of the system and (2) a current component which is proportionately related to the variable speed characteristics, if any, detected in the advancing rate of the article. The current component that is related exclusively to the advancing rate of the article is utilized in the output of the responsive circuit 24 until the entire delay period is concluded. However, the current component related to the fixed delay time characteristics, as well as the advancing rate of the article, is produced and contributes to the total current output of the responsive circuit 24 only during a designated portion of the delay period cycle. This "designated portion" of the delay period cycle is preselected, as hereinafter described in detail, so as always to be less than the minimum delay period that may be established for the particular application wherein the system is operating.

Irrespective of the variable characteristics of the system as influenced by the advancing rate of the article, the fixed delay time circuitry produces a current output for the designated portion of the delay period. However, the magnitude of the current produced by this subcircuit varies in accordance with and is proportionately related to the output of advancing rate subcircuit. Thus, the control system of the present invention, through the coaction of these subcircuits, insures that within at least a preselected period of time, compensation is provided for variations occurring in the system operation. Accordingly, at the conclusion of the delay period, the duration of which is directly influenced by the combined outputs of the subcircuits forming the responsive circuit 24, the article or a designated segment thereof is properly positioned as desired with respect to responsive device 29 so that the desired function can be initiated.

The termination of the delay cycle of the system is effected as a result of a further alteration in the conductive state of the delay period timer module of the timer control circuit 23, as hereinafter more specifically described. Concomitant with this alteration in the conductive state of the delay period timer module, the duration period timer module of the control circuit 23 is rendered effective. It is this latter response of the overall timer control circuit 23 which actually triggers the solid state switching network 28 so as to render the responsive device 29 effective.

In a manner generally similar to the aforedescribed cooperative action between the delay period timer module of the control circuit 23, the delay function circuit 26 and the delay period current generating circuitry of the responsive circuit 24, the duration period timer module, the circuit 27 and the duration period current generating circuitry of the circuit 24 coact to provide an advancing rate compensated period of operation for the responsive device under the influence of the solid state switching network 28. In this connection, the major distinction between the cooperating "delay period" circuit components and the cooperating "duration period" circuit components depends on the relative "turn-on" and "turn-off" response characteristics of the device 29. That is, depending upon whether the "turn-on" and "turn-off" time response characteristics of the device 29 differ or are the same, additional subcircuits of the responsive circuitry 24 are brought into play as hereinafter described. In any event, upon the conclusion of the compensated or uncompensated duration period cycle, the conductive state of the duration period timer module is altered to deactivate the solid state switching network and thus, conclude the desired operation of the responsive device 29 and the entire system is conditioned for subsequent cycles of operation.

Referring now to the detailed schematic illustration of a preferred embodiment of the control system contemplated by the present invention, the control system may be selectively operated in a more conventional manner without utilizing the supplementary current generating subcircuits of the responsive circuit 24. Moreover, the power supply and various of the conventional networks employed in the disclosed embodiment are merely illustrative of one form of circuit suitable for use in accordance with the present invention. Accordingly, the following description of the detailed circuit is directed primarily to those features of the control system which contribute to the compensating operation of the circuit 24 in conjunction with the circuits 23, 26, 27 and 28.

The power supply 20 preferably includes a pair of input transformers 41*a* and 41*b*. As hereinafter more fully described, the input transformer 41*a* supplies a rectifier network associated with the circuit 24 (FIG. 5). Similarly, the input transformer 41*b* drives a bridge rectifier 42, and the output of the bridge rectifier is supplied to a pair of series regulators 42*a* and 42*b* that utilize a Zener diode 42*c* for a reference potential. The series regulator 42*a* serves as a reference source to a power series regulator 43 as well as to the series regulator 42*b*. The regulator 42*b* supplies a regulated operating voltage to a light source 21*a* which, along with a photocell 21*b* constitute the transducer 21. The output of the power series regulator 43 is coupled to a conductor 45 that supplies the remaining circuits of the control system with the necessary operating potential. In addition, the output of the regulator 43 is supplied to a potentiometer 43*a* so that a selectively adjustable biasing potential is provided at the base-emitter junction of an NPN transistor 44 in the amplifier network 22.

With more specific reference to the amplifier 22, this network is preferably a photo amplifier that is connected to the output of the transducer 21. Preferably, the photocell 21*b* and light source 21*a* that form the transducer 21 are positioned relative to the conveyor 10 in the usual manner so as to be interrupted by an advancing article. In response to such interruption and a corresponding change in the resistance of the photocell 21*b* in the base of the transistor 44, the amplifier network 22 produces an output signal in the collector circuit of a PNP transistor network 46 that forms the output stage of the amplifier 22. This output signal is supplied through a coupling capacitor 47 to the input of the timer control circuit 23.

Figure 3:
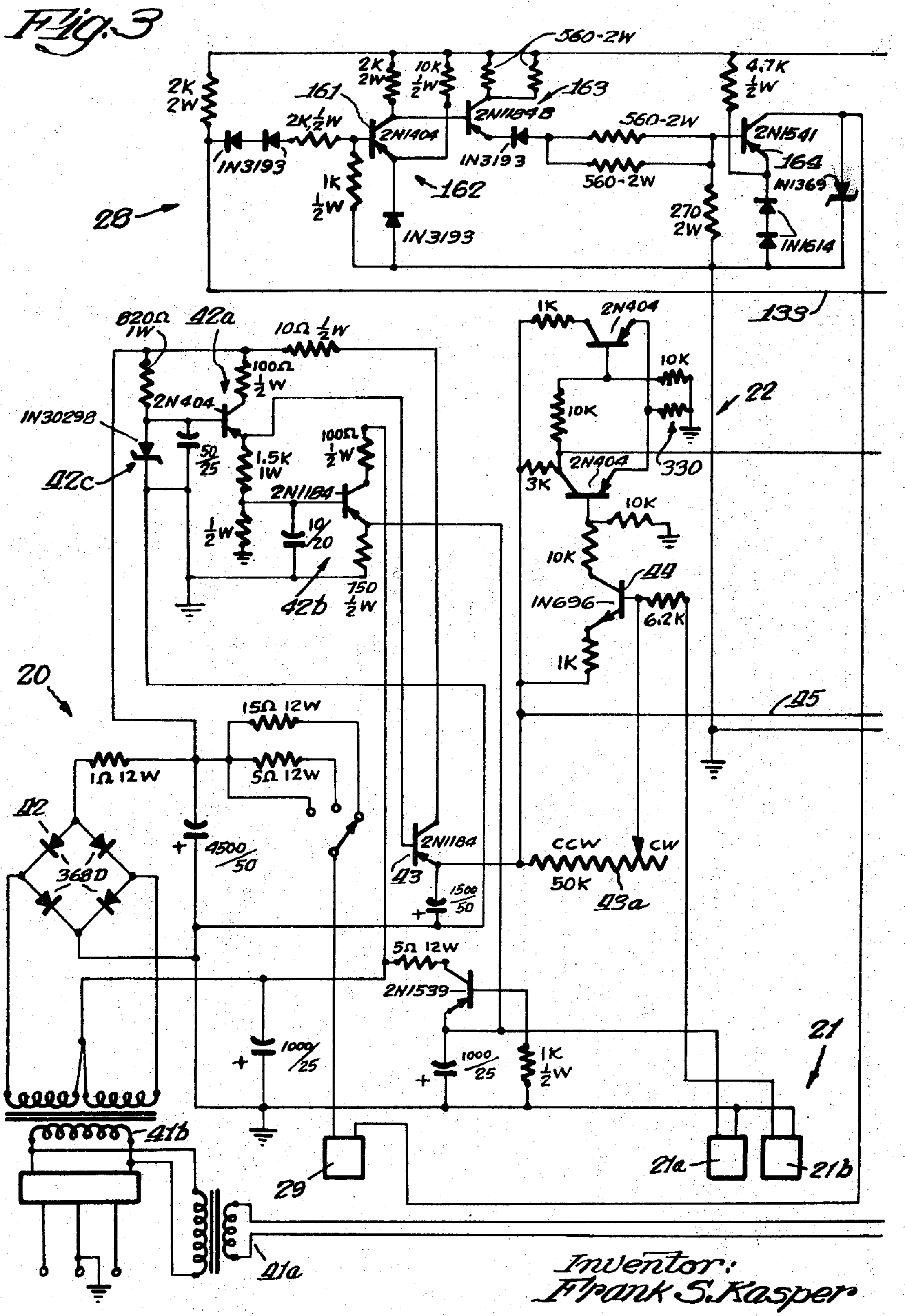
FIGS. 3, 4 and 5, when assembled as shown in FIG. 6, illustrate a preferred embodiment of the control system in detailed schematic form.
Figure 4:
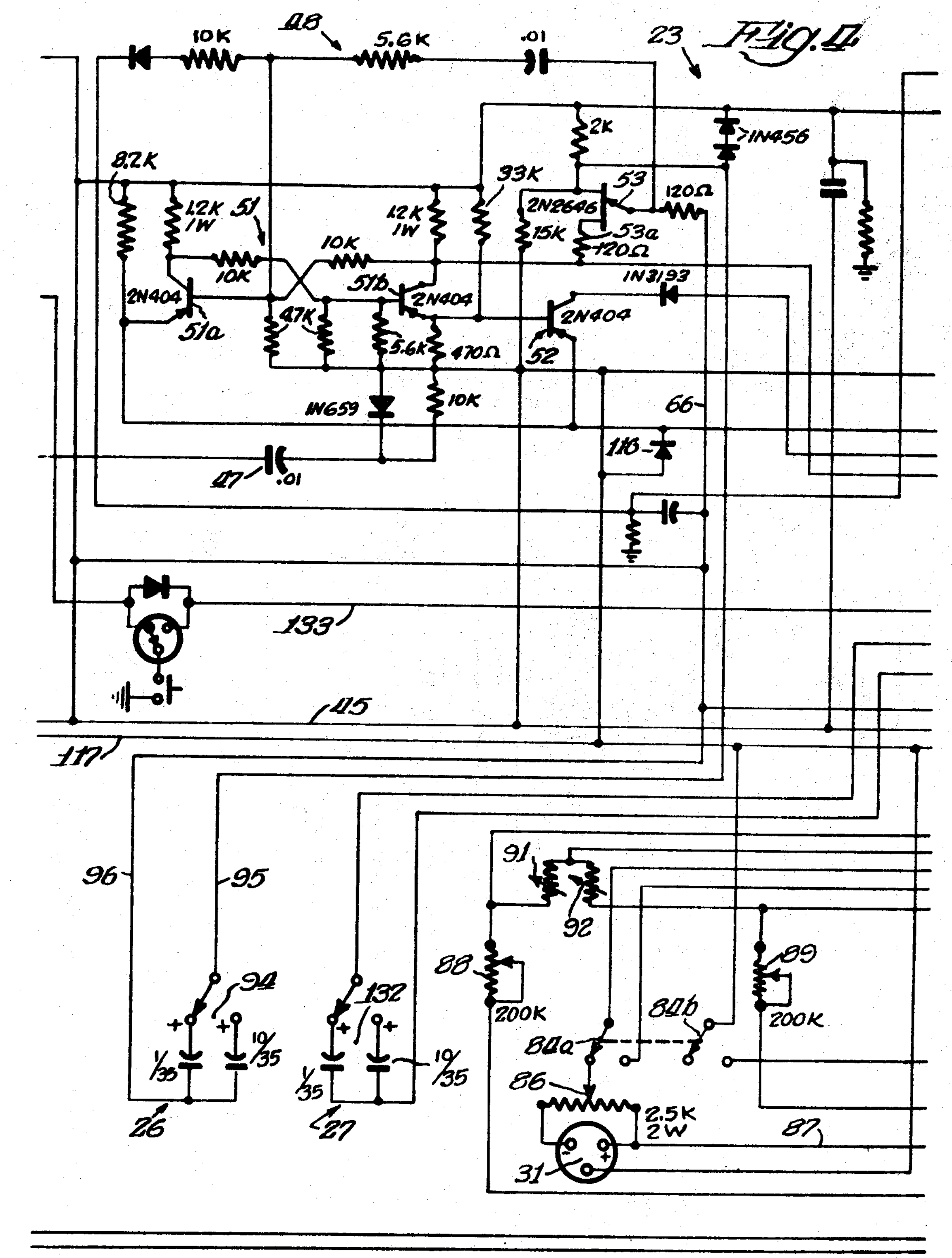

As generally outlined above, the timer control circuit 23 corresponds substantially identically to that disclosed and claimed in the aforementioned co-pending application, Ser. No. 400,322. Preferably, the control circuit 23 employs two timer modules 48 and 49. As hereinafter more fully described, the optration of the timer module 48 is related to the delay function of the control system, whereas the timer module 49 functions in conjunction with the duration circuitry of the responsive network 24 to produce an output signal that controls the actuation of the switching network 28 (FIG. 3). Referring more specifically to FIGS. 4 and 5, the timer module 48 preferably includes a bistable multivibrator 51 formed by a pair of PNP transistors 51*a* and 51*b*. In addition, the timer module 48 includes an amplifier network formed by a PNP transistor 52 and its related circuit components, as well as a unijunction firing circuit 53. In a normal or quiescent state of conduction, the transistor 51*a* of the multivibrator is rendered effective and the unijunction firing circuit is conditioned to initiate a timing cycle. That is, the unijunction circuit 53, in conjunction with the circuit 24 (FIG. 5) and the delay function circuit 26 (FIG. 4), responds to an output signal from the amplifier 22 that is coupled to the base of the normally nonconductive transistor 51*b*, which is thereby rendered conductive, to initiate the delay cycle during which the conveyor 10 aligns an advancing article (or a selected portion thereof) with the responsive device 29.

The timer module 49 is substantially identical to the module 48 and includes a bistable multivibrator 56 formed by a pair of PNP transistors 56*a* and 56*b*. In addition, the module 49 includes an amplifier network 57 and a unijunction firing circuit 58. The amplifier 57 is normally in a nonconductive state. However, this circuit responds to an alteration in the operative condition of the multivibrator 56 to provide an output signal that is supplied to and triggers the operation of the solid state switching network 28 so as to effect the controlled actuation of the responsive device 29. As with the unijunction firing circuit 53, the circuit 58 cooperates with the circuit 24 and the duration function circuit 27 to ensure that the solid state switching network 28 and, therefore, the responsive device 29 are rendered effective for the desired period of time to effect the controlled function dictated by the system.

Considering now the responsive circuit 24, specific reference should be made to FIGS. 4 and 5. As shown, the circuit 24 includes a "delay" network 61 that is formed by a primary current generating circuit 61*a*, a secondary current generating circuit 61*b*, and a timing circuit 61*c*. As hereinafter described, the timing circuit 61*c* dictates the operation of the secondary current generating circuit in conjunction with the primary current generating circuit. The responsive circuit 24 also includes a similar dual current generating circuit or "duration" network 62 that is formed by a primary current generator 62*a*, a secondary current generating circuit 62*b*, and a timing circuit 62*c*. The networks 61 and 62 are employed to compensate for the fixed delay characteristics of the overall system components and for variations in the advancing rate of the article as detected in the output of the tachometer generator 31 (FIG. 4).

Depending on the relative "turn-on" and "turn-off" delay characteristics of the responsive device 29, one or more of the secondary circuits 61*b* and 62*b* and/or timing circuits 61*c* and 62*c* are selectively utilized in the responsive network 24 to compensate for these characteristics, along with the aforedescribed variations in the advancing rate of the article. Moreover, in the particular instance when the "turn-off" delay time of the responsive device 29 is less than the time required to initiate the operation of the same device, a supplementary current shunting network 64 is also employed in the responsive network 24 while at the same time the secondary current generator 62*b* is rendered ineffective.

Various of the circuits which are selectively employed in the responsive circuit 24 to compensate for fixed and variable delay conditions are arranged to be selectively switched in or out of this circuit, as hereinafter more fully described. However, as will be understood by those skilled in the art, the responsive circuit can be constructed so as to be suited for a particular application and/or for controlling a responsive device having given characteristics. This approach substantially simplifies the circuit 24 since the switching networks and supplementary circuits not essential for that particular application are eliminated.

Considering the network 24 in somewhat greater detail, the primary current generators 61*a* and 62*a* are normally in a conductive state. That is, under quiescent conditions the PNP transistors that form these current generators are forward biased, and, for example, a path for current through the collector of the transistor 61*a* is defined by a conductor 66 and the emitter-base one junction of the unijunction 53 in the first timer module 48. A similar circuit for current flow through the collector of the transistor forming the primary current generator 62*a* is completed through the unijunction circuit 58 of the second timer module 49 when the control system is in a normal or quiescent state of conduction.

Considering the circuits of FIGS. 4 and 5 in somewhat greater detail, a bridge rectifier 71 is connected to the input transformer 41*a* and in circuit with a filter network 72 and a series voltage regulator 73. The output of these circuits produces a positive voltage at a junction 74*a*, with a somewhat lower positive potential being similarly developed at a junction 74*b* as a result of the voltage drop that is developed across the diode 75. This positive potential along with a negative biasing potential supplied to a terminal 24a through the conductor 45 conditions the circuit 24 so that both "fixed time" and "speed" compensated current generating functions are selectively performable in response to the production of an output signal by the amplifier 22. In addition, the voltage developed at the junction 74b is used as a reference potential for the tachometer generator 31 to insure that adequate operating voltage is provided to the unijunction circuits 53 and 58.

When the "turn-on" and "turn-off" delay characteristics of the responsive device 29 are identical, the switches 77a, 77b and 77c are in normally-open condition, as is the switch 78a. Under these circumstances, the responsive circuit 24 is comprised of the primary and secondary current generating "delay" networks 61a and 61b, the primary current generating "duration" network 62a, and the timing circuit 61c. Preferably, the base of the primary current generating transistor is connected through a current limiting resistor 81 and a conductor 82 to a switch contact 84a. The switch contact 84a and a second switch contact 84b are utilized to select the mode of operation for the responsive circuit 24. That is, position of these switches dictates whether or not the responsive circuit operates in a mode such that it will compensate for variations in the advancing rate of the article.

In the positions shown in FIG. 4, the switches are set to properly respond to such variations in accordance with the preferred mode of operation of the present invention in most applications. More specifically, the switch 84a completes a circuit to a potentiometer tap 86 which, along with a conductor 87, provides the output of the tachometer generator 31 to the base circuits of the PNP transistors that form the primary current generators 61a and 62a. As shown, the conductor 87 is connected to a temperature compensating diode 90. Since the output of the tachometer generator is directly related to the article advancing rate, the voltage applied to these base circuits is similarly proportional to this advancing rate.

With further reference to the "delay" network 61, the collector of the transistor 61a and the collector of the transistor 61b are both connected to the conductor 66; however, the transistor 61b is normally nonconductive due to biasing conditions applied thereto. The emitter of the primary current generating transistor 61a is connected to a variable resistor 88. The resistor 88 is manually preset in accordance with the desired "delay" and forms a part of a voltage divider including a manually preset resistor 89 which reflects the desired "duration" time. A variable resistor 91, which is connected in circuit with the resistor 88, is a current sensing resistor for controlling current in the base circuit of the secondary current generator 61b. As shown, the common junction of the resistor 91 with a current sensing variable resistor 92 is connected to the junction of the filter capacitor 83 and the biasing diode 90. This circuit arrangement establishes biasing and current limiting conditions for the circuit 24 such that the conduction of the primary current generator reflects the anticipated system delay characteristics and controls the conductive state of the secondary current generator to yield the desired variable speed compensation.

More specifically, the base of the PNP transistor that forms the secondary current generator 61b, has its base connected to the junction of the variable resistor 88 and the current sensing resistor 91, and the emitter of this transistor is connected through a resistor 101 to the output of the timing circuit 61c. The timing circuit 61c is preferably formed by a pair of transistors 102 and 103 connected in circuit to form a one-shot timing circuit and includes a positive feedback network formed by diode 104, capacitor 105, and diode 106. The junction of the capacitor 105 and diode 106 is connected to ground through a fixed resistor 105a and variable resistor 105b which, along with capacitor 105, partially dictate the timing period for the circuit 61c.

Emitter biasing potential is supplied to the NPN transistor 102 through a resistor network 107. The base of the transistor 102 is connected through a coupling capacitor 110 and a resistor 111 to the collector of the transistor 51b in the first timer module 48. A diode 114 is also connected to the base of the transistor 102 and functions to provide a path to ground for input pulses supplied to the base of the transistor when the switch 84b is in its alternate position as hereinafter described.

Considering now the more detailed operation of the overall control system when the "turn-on" and "turn-off" delay characteristics of the device 29 are the same, the aforedescribed normal conductive state of the various components prevails until an input signal is supplied for the amplifier 22 to the first timer module 48 through the coupling capacitor 47. As previously described, this input signal is an amplified signal related directly to the signal produced by the photocell 21a when an article interrupts the light source 21b and photocell.

In response to an input signal, which in accordance with the parameters inndicated in the drawings is a negative input signal, the PNP transistor 51b is rendered conductive and the transistor 51a is rendered nonconductive. When this occurs, the unijunction 53, in cooperation with the delay function circuit 26, is conditioned to respond to the output of the delay network 61 so as to delay the actuation of the responsive devices 29 for a period of time necessary to align the advancing article (or a selected segment thereof) with the device. More specifically, when the transistor 51b is rendered conductive the normal path for collector current through the conductor 66 and through the emitter-base one junction of the unijunction is interrupted. The interruption of the current path through the unijunction circuit 53 occurs as a result of near ground potential being applied to the base two junction of this element from a conductor 117 through a resistor 53a, the now conductive transistors 51b and 52, and a diode 116. In this connection and as shown in FIGS. 4 and 5, the normal path for current in the collector circuit of the primary current generating transistor network 61a (i.e. that is normally completed through the unijunction 53) is shunted by a capacitor bank 94 which, along with its associated conductors 95 and 96, defines the delay function network 26. Depending upon the length of delay desired, one of the capacitors of the capacitor bank 94 is connected in circuit with the collector of the primary current generating transistor. Thus, when the multivibrator 51 changes conductive states, the timing cycle for the firing of the unijunction 53 is initiated and will continue until the selected capacitor of the capacitor bank 94 has acquired the necessary charge to effect the firing of the unijunction.

Since the capacitor bank 94 is actually connected in circuit with the collectors of both the primary and secondary current generating transistors, the charge accumulated therein is related to the conductive state of each of these transistors. In this connection, the combined current output of the delay network 61 is initiated as soon as the conductive state of the multivibrator has been altered. That is, when the transistor 51b is rendered conductive, a signal is developed at the collector thereof, and this signal is coupled to the base of the transistor 102 through the resistor 111 and the capacitor 110. As a result, the transistor 102 is rendered conductive. Due to the drop in the voltage at the collector of the transistor 102, the transistor 103 is also rendered conductive. Collector current in the transistor 103 results in a positive feedback signal being fed to the transistor 102, and this transistor is sent into a more conductive state. It will be apparent that the network formed by the transistors 102 and 103 remains in a conductive state until such time as the capacitor 105 has been fully charged primarily through the timing resistors 105a and 105b. During conduction of the transistors 102 and 103, a voltage is developed at the junction of the resistor 101 and a collector load resistor 121 so that the secondary current generating transistor 61*b* is biased into conduction and remains conductive until the timing circuit 61*c* concludes its cycle.

In order to effect the desired compensating adjustments in the output of the delay portion 61 of the responsive circuit 24, it is necessary to establish a preselected relationship between the resistor 101, the variable resistor 91 and the timing characteristics of the circuit 61*c*. Moreover, in accordance with the present invention, it is preferable to select transistors of the type indicated so that the current flowing in the collector circuits of the primary and secondary current generators is approximately equal to the respective emitter currents. The voltage developed at the junction of the variable resistor 88 and the resistor 91 is directly proportional to the amount of emitter current flowing in the primary current generator 61*a*. Accordingly, the voltage supplied to the base of the secondary current generator 61*b* is proportional to this emitter current. Moreover, this voltage, due to selected relationship between the emitter and collector current values, dictates buildup of charge in the capacitor bank 94. Thus, if the resistor 101 is selected to be approximately one-half the size of the resistor 91, the secondary current generator yields a collector current that is twice the magnitude of the current supplied from the primary current generator, and this current component is supplied to the capacitor bank 94 as long as the timing circuit formed by the transistors 102 and 103 is rendered effective.

As generally outlined above, the duration of the timing cycle defined by the capacitor 105, the resistor 105*a*, and the variable resistor 105*b* is selected to be less than the minimum delay period that will be encountered in the particular application wherein the system is employed. Preferably, the variable resistor 105*b* is adjusted so that the duration of the timing period during which the secondary current generator 61*b* provides current to the capacitor bank 94 is approximately one-half (½) the duration of the anticipated delay period. Thus, the minimum delay period for the contribution of the secondary current generator is limited to a timing cycle of approximately one-half the delay period, and the magnitude of current supplied during this period is approximately twice that which is supplied from the primary current generator, although these parameters are selectively adjustable for any given application.

At the conclusion of the conductive period controlled by the timing circuit 61*c*, the primary current generator continues to supply current to the appropriate one of the capacitors in the capacitor bank 94 until such time as the unijunction 53 is triggered into an alternate conductive state. Since the amount of collector current supplied to the capacitor bank is directly related to the voltage output of the tachometer generator, compensation is made for any variations in the advancing rate of the article that occur as the article is advanced from the point whereat it is initially detected to a position in alignment with the responsive device 29.

When the unijunction 53 is fired due to the buildup of the necessary potential across the capacitor bank 94, the bistable multivibrator is returned to its normal conductive state. That is, the transistor 51*a* is rendered conductive and the transistor 51*b* is rendered nonconductive. The resulting negative voltage that is developed at the collector of the transistor 51*b* is supplied to the base of the transistor 56*b* through a coupling capacitor 131. Accordingly, and as described in the aforementioned copending application, the bistable multivibrator 56 is triggered into an alternate conductive state and the amplifier 57 is rendered conductive. As described in conjunction with the first timer module 48, the second timer module 49 cooperatively functions with the duration function circuit 27, including a capacitor bank 132, and the network 62 including at least the primary current generator 62*a*. The timing cycle for the firing of the unijunction 58 is thus initiated, and the amplifier 57 produces an output signal that is supplied through a conductor 59 to a conductor 133 at the input of the solid state switching network 28 (FIG. 3).

As long as the control system is functioning in an environment wherein the "turn-on" and "turn-off" delay characteristics of the responsive device 29 are equal in duration, only the primary current generator 62*a* contributes to the buildup of charge in the capacitor bank 132 and, therefore, to the timing cycle of the unijunction 58. In those cases where the "turn-off" delay characteristics of the responsive devices exceed the "turn-on" delay characteristics, the switch contacts 78*a* and 77*b* are closed to bring the secondary current generator 62*b* into the network 62 along with the timing circuit 62*c*, both of which circuits are employed in the responsive circuit 24 in a manner identical to the aforedescribed current generator 61*b* and timing circuit 61*c*.

In this connection, the timing characteristics of the timing circuit 62*c* (i.e. which includes the transistors 141 and 142 and an R-C tming network formed by a variable resistor 143, the resistor 144 and the capacitor 146) are preset so that the secondary current generator 62*b* is rendered conductive at the outset of the unijunction firing cycle. Similar to the current generator 61*b*, the secondary current generator 62*b* supplies an additional amount of collector current to the capacitor bank 132 during a period equal to one-half the time difference between the "turn-off" and "turn-on" characteristics of the responsive device 29. Preferably, the value of the resistor 148 in the emitter circuit of the secondary current generator 62*b* is again selected to be approximately one-half (½) the value of the resistor 92. Thus, the necessary supplementary current is supplied to the capacitor bank 94 to effect the desired firing of the unijunction 58.

In those instances where the "turn-on" delay characteristics of the responsive device exceed the "turn-off" delay characteristics, the secondary current generator 62*b* is not employed, and the switch contact 78*a* is open, although the contacts 77*a*, 77*b* and 77*c* are closed. Thus, the timing circuit 62*c* is utilized under these operating conditions as is the supplementary shunting network 64. During this mode of operation, the timing circuit 62*c* compensates for the excessive "turn-on" time during the "delay" time cycle. Accordingly, and to ensure that the necessary adjustments is also made in the duration cycle, a portion of the current derived from the primary current generator 62*a* during the duration cycle is shunted to the network 64 so that the duration cycle is effectively increased.

In this connection, the conductive state of the network 64 and more particularly of the NPN transistor 151 that is employed therein is dictated by the output of the transistor 142. That is, when the transistor 142 is rendered conductive during the timing cycle of the circuit 62*c*, the resulting change in collector potential is supplied to the base of the transistor 151. This signal is supplied through the closed switch contact 77*c* and a resistor 152 which, along with the resistor 153, forms a voltage divider network to provide the necessary biasing potential at the base of the transistor 151. When the transistor 142 is rendered conductive, the transistor 151 is biased into a conductive state and a path for a portion of the current in the collector circuit of the primary current generator 62*a* is provided to ground through the closed contacts 77*a*, the collector-emitter junction of the transistor 151, and a biasing resistor 156. Irrespective of the mode of operation of the responsive circuit 24, under the control of one or more of the primary or secondary current generating circuits, the desired "duration" timing cycle is completed as the unijunction 58 is fired.

Throughout this timing cycle and prior to the unijunction 58 being rendered conductive, an output signal from the amplifier 57 in the second timer module is continuously supplied to the solid state switch 28. Referring to FIG. 3, the conductor 133 supplies the signal from the amplifier 57 to an input terminal that is connected to the base of a PNP transistor 161 in an inverter circuit 162. The transistor 161 is normally in a conductive state; however, when the amplifier 57 is rendered conductive the input to the inverter circuit 162 causes the transistor 161 to be cut off. Emitter follower 163 responds to the variation in the conductive state of the inverter circuit 162 to trigger a PNP transistor 164 into conduction. As a result, current flow in the collector-emitter circuit of the transistor 164 causes the responsive device 29 to be rendered effective, and the solid state switching network 28 remains in this current supplying condition until the unijunction 58 has fired and the amplifier 57 returns to its non-conductive state.

As generally outlined above, the responsive circuit 24 can be operated independent of the output of the tachometer generator 31 by placing the switches **84*a* and 84*b* in the alternate position. When this is effected, the switch contact 84*b* precludes either of the timing circuits 61*c* or 62*c* from being rendered effective, since the input pulses which would normally actuate these circuits are now shunted to ground. In addition, the function of the primary current generating circuits 61*a* and 62*a* is no longer controlled by a variable output corresponding to the output of the tachometer generator but is now dictated by the output voltage of the power supply 20. Thus, the delay and duration functions performed by the circuit are dictated by the settings of the resistors 88, 89, 91 and 92**.

It will be apreciated that the present invention provides novel means for accurately controlling the actuation of various responsive instrumentalities independent of inherent system delay conditions and/or other variations in system operation. Through the employment of the coacting primary and secondary current generating circuits in the responsive circuit 24, the delay characteristics are readily compensated for at the initial stage of an operating cycle, effectively as though the delay had been anticipated even prior to the initiation of a cycle of operation. This feature of the invention can perhaps best be appreciated from a consideration of FIG. 7.

With reference to FIG. 7 and considering the graphically represented line OAB, this line depicts the buildup of energy necessary to either trigger the responsive device or to turn off the responsive device after it has been rendered operative for a preselected period of time. Accordingly, the portion of the curve represented by the line OA depicts the period of the operating cycle during which both the primary and secondary current generating circuits of the appropriate network are being rendered effective, and the portion of the curve represented by the line AB depicts the operation of the system during the remaining portion of the cycle when only the primary current generating circuit is providing current to the appropriate capacitor bank 94 or 132. Since the segment of the time base $T_F$ indicates the anticipated delay time of the system, it will be seen that the cooperative functioning of the primary and current generating circuits achieves the same ultimate result in the accurate buildup of energy within the desired period of time. This occurs as though the buildup of energy had been initiated at the negative time "$T_F$" with only the primary current generator contributing to this energy buildup. The line OCD similarly represents the unique functioning of the system of the present invention at a different speed and under circumstances when the desired energy level is sought to be achieved within a time period designated by thte legend $T_P2$. It is thus apparent that the present invention contemplates a compensated negative time characteristic to achieve the accurate and reliable actuation of the controlled instrumentalities independent of variations in other operating conditions within the system.

It will also be appreciated that the foregoing is merely illustrative of the invention. Although only a single channel system has been described, it will be apparent to those skilled in the art that multiple, parallel channels might also be utilized to effectively handle a plurality of products being advanced on a production basis by means of a conveyor 10. Similarly, it will be appreciated that in receptacle filling applications, a device comparable to a tachometer generator will be employed but that the output of this device will be indicative of the flow rate of the product to a stationary receptacle as distinguished from the advancing rate of a receptacle relative to a stationary responsive instrumentality. In any event, the systems of the present invention have broad applicability to a variety of production facilities. Consequently, modifications in the various system components and/or in their functional relationship to other components necessary to meet the requirements of various diverse applications would not constitute a departure from the invention, various features of which are set forth in the accompanying claims.

What is claimed is:

1. A timer control circuit for generating a timing cycle to compensate for both an external fixed time delay signal and an external time variable delay signal comprising:

a primary current generator means responsive to said time variable delay signal for developing a current output proportional in magnitude to said time variable delay signal, said primary current generator means being actuated by said time variable delay signal at the commencement of a timing cycle;

secondary current generator means responsive to said fixed time delay signal and said time variable delay signal for developing a current output proportional in magnitude to said fixed time delay signal and said time variable delay signal;

timing means responsive to initiation of said timing cycle for operating said secondary current generator means during said timing cycle for a predetermined time interval shorter in duration than the minimum anticipated duration of said timing cycle of said primary current generation means; and delay means coupled to receive the current outputs of both said primary and secondary current generator means for terminating said timing cycle when the accumulated current outputs exceed a predetermined value.

2. A timer control circuit in accordance with claim 1 in which said delay means comprises at least one capacitor and in which said timing cycle is terminated when the time integrated magnitude of the combined current outputs of said primary and secondary current generator means exceed said predetermined value.

3. A timer control circuit in accordance with claim 2 in which said timing means actuates said secondary current generator means upon initiation of said timing cycle.

4. A timer control circuit in accordance with claim 3 wherein said delay means further comprises first transistor means connected in circuit with said first and second current generating means.

5. A timer control circuit in accordance with claim 4 wherein said primary current generator means comprises a second transistor means.

6. A timer control circuit in accordance with claim 4 wherein said secondary current generator means comprises a third transistor means.

7. A timer control circuit for generating a timing interval of a duration determined both by a time variable primary delay function and a secondary delay function, comprising:

primary current generator means responsive to a time variable input signal for developing a current output proportional in magnitude to a said input signal, said primary current generator means being actuated by said time variable input signal at the commencement of a timing cycle;

secondary current generator means adapted for developing a current output proportional to a predetermined input signal;

timing means responsive to initiation of said timing cycle for operating said secondary current generator means during said timing cycle for a predetermined time interval shorter in duration than the minimum anticipated duration of said timing cycle;

and delay means coupled to receive the current outputs of both said primary and secondary current generator means for terminating said timing cycle when the accumulated current outputs exceed a predetermined value.

8. A timer control circuit in accordance with claim 7 in which said delay means comprises at least one capacitor and in which said timing cycle is terminated when the time integrated magnitude of the combined current outputs of said primary and secondary current generator means exceed said predetermined value.

9. A timer control circuit in accordance with claim 8 in which said timing means actuates said secondary current generator means upon initiation of said timing cycle.

References Cited

UNITED STATES PATENTS

| | | | |
|---|---|---|---|
| 3,015,062 | 12/1961 | George et al. | 307—293 X |
| 3,364,366 | 1/1968 | Dryden | 328—127 X |

STANLEY D. MILLER, Primary Examiner

U.S. Cl. X.R.

307—246, 263, 283, 294; 328—77, 86, 129, 185